United States Patent [19]

Trassl

[11] 4,452,422
[45] Jun. 5, 1984

[54] ELECTROHYDRAULIC ACTUATING DRIVE FOR VALVES

[75] Inventor: Werner Trassl, Mülheim, Fed. Rep. of Germany

[73] Assignee: Kraftwerk Union, Fed. Rep. of Germany

[21] Appl. No.: 399,910

[22] Filed: Jul. 19, 1982

[30] Foreign Application Priority Data

Jul. 23, 1981 [DE] Fed. Rep. of Germany ... 8121690[U]

[51] Int. Cl.³ .......................................... F16K 31/122
[52] U.S. Cl. ....................................... 251/25; 60/413
[58] Field of Search ..................... 251/12, 25, 26, 30; 60/413

[56] References Cited

U.S. PATENT DOCUMENTS

| | | | |
|---|---|---|---|
| 3,682,436 | 8/1972 | Legille | 251/30 |
| 4,054,155 | 10/1977 | Hill | 251/25 |
| 4,135,547 | 1/1979 | Akkermann et al. | 60/413 |
| 4,136,520 | 1/1979 | Jerstraeten | 60/413 |

FOREIGN PATENT DOCUMENTS 1183760 12/1964 Fed. Rep. of Germany .

Primary Examiner—Martin P. Schwadron
Assistant Examiner—James R. Shay
Attorney, Agent, or Firm—Karl F. Milde, Jr.; Andrew G. Rodau

[57] ABSTRACT

An electrohydraulic actuating drive for a valve is constructed as a compact drive block which is mounted on the housing of the valve. The drive block includes a support structure which supports other components of the actuating drive on the valve housing and which consists of two plate-shaped end walls one of which is secured to the valve housing, and at least two carrier members which interconnect the end walls and keep the other end wall at an axial distance from the one end wall. One of the other components of the actuating drive is a non-carrying removable tubular circumferential wall which surrounds the support structure and is in sealing contact with the end walls to form a storage receptacle for a low-pressure hydraulic fluid therewith. The remaining components of the actuating drive are a hydraulic pump, an electric motor driving the pump, a pressure storage, a hydraulic actuating cylinder-and-piston unit, a force storage spring and an electrohydraulic transducer. The pump draws the hydraulic fluid from the storage receptacle and delivers the same at an elevated pressure to the pressure storage from where the fluid is supplied to the actuating unit. The piston rod of the actuating unit extends through the storage receptacle between the carrier members and is connected to the valve member. The force storage spring urges the valve member in the closing direction and is accommodated in the storage receptacle around the piston rod. The pressure storage may be at least partially accommodated in the storage receptacle. The carrier members have channels therein which constitute a part of the hydraulic circuit of the actuating drive.

12 Claims, 1 Drawing Figure

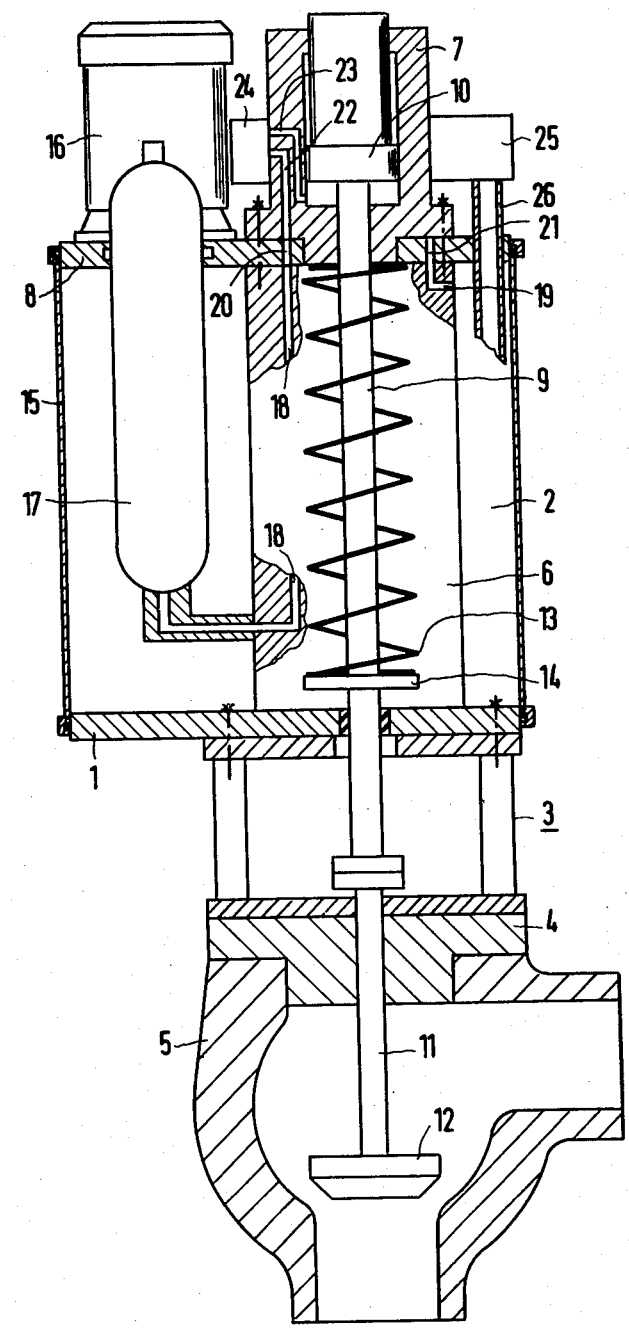

ELECTROHYDRAULIC ACTUATING DRIVE FOR VALVES

BACKGROUND OF THE INVENTION

The invention relates to an electrohydraulic actuating device for valves, and more particularly for steam turbine valves.

There are already known various constructions of electrohydraulic drives for valves, among them such which are self-contained, that is, which include all the components needed for actuating the valve in response to electric signals. More particularly, such drives include, in addition to a hydraulic actuating cylinder-and-piston unit (hereafter cylinder for short), a storage receptacle for the hydraulic fluid, a hydraulic pump, an electric motor for driving the pump, and an electrohydraulic transducer. These components are directly or indirectly mounted on the valve housing or on a lantern-shaped distancing and heat-dissipating element (hereafter called lantern) so mounted on the valve housing proper as to constitute a portion thereof.

An electrohydraulic actuating drive for valves of this type is known from the published German application DE-AS No. 11 83 760. In one of the constructions described therein, the electro-hydraulic transducer, the hydraulic actuating cylinder, the electric motor and the hydraulic pump are mounted on a plate which serves as a lid of the storage receptacle for the hydraulic fluid. The hydraulic actuating cylinder is supported on the valve housing by means of correspondingly strongly constructed walls of the storage receptacle and a valve lantern arranged between the valve housing and the storage receptacle. The operating rod of the hydraulic actuating cylinder passes through the storage receptacle.

It is practically impossible to use the known electrohydraulic actuating drive for the actuation of turbine valves, such as regulating, rapid-closing or bypass valves of steam turbines. In such turbine valves, there must be, on the one hand, applied extremely high actuating foces at low actuating times, while, on the other hand, even the accommodation of the turbine valves themselves in the limited spatial conditions brings about difficulties. Therefore, small structural sizes and small structural weights are required from the corresponding actuating drives. Should the individual structural components be dimensioned in concordance with the actuating forces and the actuating times of turbine valves, the compact drive block of the known electrohydraulic actuating drive would be so large and heavy that an arrangement on the valve housing would no longer be possible.

SUMMARY OF THE INVENTION

Accordingly, it is a general object of the invention to provide an electrohydraulic actuating drive for turbine valves which satisfies the high requirements with respect to actuating force and actuating speed at relatively low structural size and low structural weight.

In pursuance of this object and others which will become apparent hereafter, one feature of the present invention resides in an electrohydraulic actuating drive for valves, consisting of an electro-hydraulic transducer, a hydraulic actuating cylinder and an electromotor for driving a hydraulic pump which delivers the hydraulic fluid from a storage receptacle into an actuating circuit, wherein the hydraulic actuating cylinder is supported through the storage receptacle on the valve housing and the operating rod of the hydraulic actuating cylinder passes through the storage receptacle, and wherein all of the structural parts are integrated into a compact drive block arranged on the valve housing, wherein the drive block additionally incorporates at least one hydraulic pressure storage connected at the pressure side to the hydraulic pump, and a force storage spring active in the closing direction of the valve; the support of the hydraulic actuating cylinder occurs through at least two carriers arranged in the interior of the storage receptacle which receive the force storage spring and the operating rod between themselves and are rigidly connected with a bottom plate and a cover plate of the storage receptacle; the non-carrying jacket of the storage receptacle is constructed as a removable cylinder concentrically sealingly surrounding the bottom plate and the cover plate As a result of the additional use of at least one hydraulic pressure storage and a force storage spring, the actuating movements of the valve are obtained due to the cooperation of two storages, wherein the force storage spring acts as the first storage directly in the closing direction, and wherein the pressure storage acts as the second storage through the hydraulic actuating cylinder in the opening direction. The electric motor and the hydraulic pump can then be dimensioned so small that the delivery stream of the hydraulic pump need only be designed to the make up for leakage losses and for the slow filling of the pressure storage. Despite the additional use of these two storages, the entire drive block can be extremely compactly constructed in that the support of the hydraulic actuating cylinder occurs through at least two carriers which are arranged in the interior of the storage receptacle, which receive the force storage spring and the operating rod between themselves and are rigidly connected with a bottom plate and a cover plate of the storage receptacle, and that the non-carrying jacket of the storage receptacle is constructed as a removable cylinder which concentrically sealingly surrounds the bottom plate and the cover plate. Thus, the space requirement for accommodating the carriers, the force storage spring and the operating rod is reduced, due to the accommodation in their interior of the storage receptacle, to the volume of the displaced hydraulic fluid. Besides, the support construction constituted by the carriers, the bottom plate and the cover plate relieves the jacket of the storage receptacle, so that the same can be constructed as a light and removable cylinder and the structural parts arranged in the interior of the storage receptacle are easily accessible from the exterior upon removal of the jacket. A further advantage of the described construction is to be seen in that, in the event of use of a spring column consisting of dish springs as the force storage spring, lubrication and thus reduction of the friction is effected by the hydraulic fluid.

In a preferred embodiment of the invention, the hydraulic pressure storage is at least partially arranged in the interior of the storage receptacle. Even the hydraulic pump can be advantageously arranged in the interior of the storage receptacle, wherein the accessibility from the exterior with the jacket of the storage receptacle removed is assured. Linings which are intended to prevent an uncontrolled escape of hydraulic fluid in the event of possible leakages of hydraulic pump or hydraulic pressure storage can be dispensed with due to the accommodation of these structural parts in the storage receptacle. Besides, even the expense for the hydraulic connection of the individual structural parts can be considerably reduced due to the accommodation of hydraulic pump and pressure storage in the storage resceptacle.

Further advantageous features of the invention will become apparent from the following description and from the claims.

BRIEF DESCRIPTION OF THE DRAWING

The construction and operational mode of an example of the embodiment of the invention are explained in more detail based on the accompanying sole FIGURE of the drawing which is a diagrammatic longitudinal section through an electrohydraulic actuating drive of the invention as arranged on a turbine valve.

DETAILED DESCRIPTION OF THE PREFERRED EMBODIMENT

The electrohydraulic actuating drive, which is constructed as a compact drive block, is placed with the bottom plate 1 of a storage receptacle, which is in its entirety identified by the reference numeral 2, on the head of a valve lantern 3 which, on its part, is affixed to the valve lid 4 of a turbine valve 5. Two quadrangularly prismatic, and mutually parallel, carrier plates 6, each of which is rigidly connected with one of its end faces to the bottom plate 1 and with its other end face to a hydraulic actuating cylinder 7, serve as a central support construction of the entire drive block. The cover plate 8 is rigidly clamped between the other end faces of the two carrier plates 6 and the hydraulic actuating cylinder 7. Between the two carrier plates 6, there is arranged an operating rod 9 which connects the actuating piston 10 of the hydraulic actuating cylinder 7 with a valve spindle 11, which carries the valve cone 12 of the turbine valve 5 at its end. Of the two carrier plates 6, only that one can be seen in the drawing which is situated behind the plane of the drawing or behind the operating rod 9. The other, non-illustrated, carrier plate 6 is situated at the same distance frontwardly of the drawing plane or frontwardly of the operating rod 9. The space between the two carrier plates 6 is provided also for the accommodation of the force storage spring 13. This force storage spring 13 is so arranged on the operating rod 9 between a dish 14 that is attached to the operating rod 9 and the hydraulic actuating cylinder 7 that it is tensioned during the opening of the turbine valve 5 by a corresponding stroke of the actuating piston 10 and is operative for rapidly closing the turbine valve 5 after the pressure acting on the actuating pistion 10 has been relieved.

The storage receptacle 2 is delimited by the bottom plate 1, the cover plate 8 and a circularly cylindrical jacket 15. The operating rod 9 passes through the entire storage receptacle 2 and is fluid-tightly guided through the bottom plate 1. The jacket 15 of the storage receptacle 2 surrounds the operating rod 9, the force storage spring 13 and the two carrier plates 6, so that the space between these structural parts can be fully utilized for the accommodation of the hydraulic fluid. The rigid support construction constituted by the bottom plate 1, the two carrier plates 6 and the cover plate 8 renders it possible to make the jacket 15 thin-walled. The jacket 15 which merely concentrically sealingly surrounds the bottom plate 1 and the cover plate 8, and can be removed after the storage receptacle 2 has been emptied.

A hydraulic pump driven by an electric motor 16 delivers the hydraulic fluid from the previously described storage receptacle 2 into the actuating circuit. However, the hydraulic pump does not pump the hydraulic fluid directly into the actuating circuit; rather it pumps the same mediately through a hydraulic pressure storage 17. The the delivery stream of the hydraulic pump is designed only to make up for the leakage losses and for the slow filling of the hydraulic pressure storage 17. The electric motor 16 is arranged next to the hydraulic actuating cylinder 7 on the cover plate 8 and its output shaft fluid-tightly passes through the cover plate 8. Also the largest part of the hydraulic pressure storage 17, which is constructed as a gas storage, is arranged in the interior of the storage receptacle 2. Only the gas connector and the diaphragm are accessible from the exterior. The region of penetration of the hydraulic pressure storage 17 through the cover plate 8 is constructed in a fluid-tight manner. No problems arise on occurrence of possible leakages at the region of the pressure-side connector of the hydraulic pressure storage 17 which is connected to a carrier plate 6, or at the region of the pressure-side connector of the hydraulic pump, since the escaping fluid is captured in the storage receptacle 2.

The two carrier plates 6 have, besides the function as a central carrying construction of the entire drive block, additionally also the function to hydraulically interconnect the individual structural parts of the electrohydraulic actuating drive with one another, so that it is possible to entirely or at least largely dispense with connecting conduits. This hydraulic connection occurs through channels provided in the carrier plates 6, of which channels 18 and 19 of the carrier plate 6 arranged behind the plane of the drawing can be recognized in the drawing. Further hydraulic connecting channels are provided in the cover plate 8 and in the cylinder housing of the hydraulic actuating cylinder 7, of which connecting channels 20 and 21 provided in the cover plate 8 and connecting channels 22 and 23 provided in the hydraulic actuating cylinder 7 can be recognized in the drawing. A first module 24 of an electro-hydraulic, which is connected to the hydraulic actuating cylinder 7, transducer is connected through the connecting channels 22 and 20 and the channel 18 following the same with the hydraulic pressure storage 17, and through the connecting channel 23 with the space of the hydraulic actuating cylinder 7 that is situated underneath the actuating piston 10. A second module 25 of the electro-hydraulic transducer, which is otherwise not illustrated in more detail in the drawing, that is mounted on the hydraulic actuating cylinder 7, is connected through a short discharge conduit 26 with the interior of the storage receptacle 2 so that, during closing operation of the turbine valve 5, the hydraulic fluid can be rapidly discharged from the space underneath the actuating piston 10 in a manner which is not illustrated in any more detail.

In the previously described example of the embodiment, the hydraulic actuating cylinder 7, the modules 24 and 25 mounted thereon and the electric motor 16 are so arranged that they do not project beyond the edge of the circular cover plate 8, so that the jacket 15 of the storage receptacle 2 can be unhinderedly removed in this direction. In this manner, all of the structural parts arranged in the interior of the storage receptacle 2 can be made easily accessible from the exterior. Deviating from the example of the embodiment as shown in the drawing, there can be accommodated in the interior of the storage receptacle even two or more hydraulic pressure storages and, as the case may be, even two hydraulic pumps.

What is claimed is:

1. An electrohydraulic actuating drive for a valve that includes a valve housing and a valve member received in the valve housing for movement along an axis in and opposite to a closing direction, comprising a compact drive block mounted on the valve housing and including a support structure that includes at least two carrier members extending along and transversely spaced from the axis and having respective first and second end portions respectively closer and more remote from the valve housing, and a first and a second plate-shaped end wall respectively rigidly connected to said first and second end portions of said carrier members; a non-carrying removable tubular circumferential wall surrounding said support structure in sealed contact with said end walls to form a storage receptacle for a low-pressure hydraulic fluid therewith; a hydraulic actuating cylinder-and-piston unit including a cylinder mounted on said support structure at said second end wall and a piston rod passing through said storage receptacle between said carrier members and connected to the valve member; a force storage spring accommodated in said storage receptacle between said carrier members and urging said valve member in the closing direction; and means for operating said hydraulic actuating unit mounted on said support structure and including an electro-hydraulic transducer, a hydraulic pump having a low-pressure side connected to said storage receptacle and a high pressure side, an electric motor connected to said hydraulic pump for driving the same and at least one hydraulic pressure storage connected to said high-pressure side of said hydraulic pump and to said hydraulic actuating unit.

2. The electrohydraulic actuating drive as defined in claim 1, wherein said hydraulic pressure storage is at least partially accommodated in said storage receptacle.

3. The electrohydraulic actuating drive as defined in claim 1, wherein said hydraulic pump is accommodated in said storage receptacle.

4. The electrohydraulic actuating drive as defined in claim 3, wherein said hydraulic pump and said electric motor are situated at opposite sides of said second end wall.

5. The electrohydraulic actuating drive as defined in claim 1, wherein said second end wall is rigidly clamped between said hydraulic actuating unit and said carrier members.

6. The electrohydraulic actuating drive as defined in claim 1, wherein said piston rod extends along the axis; and wherein said circumferential wall is eccentric relative to the axis.

7. The electrohydraulic actuating drive as defined in claim 1, wherein said carrier members are configured as quadrangularly prismatic plates extending parallel to one another and to the axis.

8. The electrohydraulic actuating drive as defined in claim 1, wherein said hydraulic pressure storage is affixed to at least one of said carrier members.

9. The electrohydraulic actuating drive as defined in claim 1, wherein said hydraulic pump, said storage receptacle, said hydraulic pressure storage, and said hydraulic actuating unit are incorporated in a hydraulic circuit; and wherein said carrier members have internal channels constituting at least a part of said hydraulic circuit.

10. The electrohydraulic actuating drive as defined in claim 9, wherein said second end wall and said hydraulic actuating cylinder have hydraulic connecting channels constituting another part of said hydraulic circuit.

11. The electrohydraulic actuating drive as defined in claim 1, wherein said piston rod and said force storage spring are arranged centrally between said carrier members.

12. The electrohydraulic actuating drive as defined in claim 1 for use on a valve housing including a valve lantern, wherein said compact drive block is mounted on said valve lantern.

* * * * *